(12) United States Patent
Phillips (10) Patent No.: US 8,770,597 B1
(45) Date of Patent: Jul. 8, 2014

(54) COLLAPSIBLE SHELF AND DOLLY SYSTEM

(76) Inventor: Howard Phillips, Upperco, MD (US)

( * ) Notice: Subject to any disclaimer, the term of this patent is extended or adjusted under 35 U.S.C. 154(b) by 0 days.

(21) Appl. No.: 13/534,941

(22) Filed: Jun. 27, 2012

(51) Int. Cl.
*B60B 1/04* (2006.01)

(52) U.S. Cl.
USPC .................... 280/30; 280/47.19; 280/47.27

(58) Field of Classification Search
CPC ................ B60B 1/04; B60B 3/02; B60B 7/12
USPC ............. 280/47.18, 47.28, 47.26, 47.19, 648, 280/30, 47.29, 65.2, 47.27
See application file for complete search history.

(56) References Cited

U.S. PATENT DOCUMENTS

| | | | | |
|---|---|---|---|---|
| 2,784,004 | A * | 3/1957 | Hamrick, Jr. ................... | 280/30 |
| D180,868 | S * | 8/1957 | Adam ........................ | 280/47.19 |
| 4,220,346 | A | 9/1980 | Geschwender | |
| 4,448,434 | A | 5/1984 | Anderson | |
| 4,934,718 | A | 6/1990 | Voegele | |
| 5,118,130 | A | 6/1992 | Kaltz | |
| 5,203,815 | A * | 4/1993 | Miller ........................ | 280/47.19 |
| 5,213,360 | A * | 5/1993 | Lin ............................... | 280/648 |
| 5,547,205 | A * | 8/1996 | do Rosario Sousa de Cabedo ............................ | 280/30 |
| 5,626,352 | A * | 5/1997 | Grace ......................... | 280/47.29 |
| 5,863,055 | A | 1/1999 | Kasravi et al. | |
| 6,152,462 | A | 11/2000 | Barrett | |
| 6,345,830 | B1 * | 2/2002 | Chavez ....................... | 280/47.28 |
| 6,398,235 | B1 * | 6/2002 | Cary ........................... | 280/47.26 |
| 6,659,476 | B2 * | 12/2003 | Weida ......................... | 280/47.19 |
| 6,880,851 | B1 * | 4/2005 | Summers et al. ............. | 280/652 |
| 7,040,635 | B1 * | 5/2006 | Remole ....................... | 280/47.18 |
| 7,726,669 | B2 * | 6/2010 | Alexander .................. | 280/47.19 |
| 7,823,893 | B2 | 11/2010 | Meyers et al. | |
| 2010/0171290 | A1 | 7/2010 | Wise | |
| 2010/0253025 | A1 | 10/2010 | Smith | |

* cited by examiner

*Primary Examiner* — Hau Phan
(74) *Attorney, Agent, or Firm* — Rosenberg, Klein & Lee (57) ABSTRACT

A collapsible shelf and dolly system which may be used in either the capacity of a dolly or as a shelf. The dolly has a frame and a base member upon which objects are mounted during displacement of the dolly. A first shelf mechanism is rotatably coupled to an upper section of the frame and a second shelf mechanism is rotatably coupled to a lower section of the frame with the first and second shelf mechanisms having a first deployment position for mounting objects thereon and a second operational position next to the frame for transporting objects mounted on the base member.

18 Claims, 9 Drawing Sheets

COLLAPSIBLE SHELF AND DOLLY SYSTEM

FIELD OF THE INVENTION

This invention relates to the field of transporting objects. Further, this invention is directed to the combined fields of transporting and shelving systems. This invention is directed to the field of transporting objects through use of a dolly system. Further, this invention is directed to the field of a combined dolly and shelf system where objects may be transported on the dolly system and then elements of the dolly system may be deployed into a stable shelf system for mounting objects thereon. This invention is further directed to fields of use where transportation and mounting of objects within a confined space is of importance and areas of use include industrial installations, educational institutions, as well as domestic areas.

BACKGROUND OF THE INVENTION

Dolly systems for transportation of objects which are heavy and/or cumbersome to manipulate is an area of interest in both the commercial and domestic marketplaces. Once the objects have been transported, the objects generally have to be taken from the dolly system and placed in an area for future use. By combining a dolly with a shelving system which can be actuated once the objects have been transported results in a large saving in time, energy and space saving on the part of a user.

Dolly systems have been known for transporting objects from one place to another. Objects may be mounted on a hand cart like dolly system and displaceably moved from one area to another. Additionally, dolly systems which may be converted to a shelf system are found for mounting objects on the dolly system when appendages are deployed.

PRIOR ART

The best prior art known to the Applicant are U.S. Pat. Nos. 7,726,669; 6,152,462; 5,626,352; and, 5,863,055. However, each of these references, taken alone or in combination, provide distinct disadvantages when taken with respect to the subject collapsible shelf and dolly system.

U.S. Pat. No. 7,726,669 is directed to a collapsible table and dolly which does provide for a type of collapsible dolly system which may include a surface for allowing objects to be mounted thereon. However, such systems do not provide for a combination of a first and second shelf mechanism which are rotatably coupled to each other and to the frame for allowing a first deployment position to mount objects on the dolly and the second operational position where the shelves are mounted adjacent to the frame of the dolly. Such prior art utilize a plurality of supporting elements to maintain the supporting of the objects of the dolly system in a deployment position for mounting the objects on the surfaces.

Other prior art such as that shown in U.S. Pat. No. 6,152,462 provide for convertible hand cart systems which provide for a mechanism which allows a dolly-like cart to be converted to a table structure, however, such does not permit the interrelation and coupling of a first and second shelf mechanism construction to permit ease of collapsibility and deployment to a position where objects may be stored and mounted on the dolly system.

Other prior art, such as that shown in U.S. Pat. No. 5,626,352 provide for a plurality of ledges extending from a first side of the dolly frame, but do not provide for interrelation and coupling between the shelving mechanisms, as is necessary to the subject system whereby a simple collapsing and deployment of the shelving mechanisms provides for additional ease and handling of the dolly system.

Still further, other prior art, such as that shown in U.S. Pat. No. 5,863,054 direct themselves to personal carts where there is a plurality of shelf-like elements on one side of the dolly-like system. However, such shelving system is devoid of any coupling between the shelving systems to permit a deployment of supporting legs which allows for a stable deployment position for the dolly system.

SUMMARY OF THE INVENTION

A collapsible shelf and dolly system is disclosed where there is provided a dolly having a frame and a base member. The frame member extends in a substantially vertical plane with respect to the base member which extends in a substantially horizontal plane. A displacement mechanism is mounted to the frame to allow displacement of the shelf and dolly system along some base surface. A first shelf mechanism is rotatably coupled to an upper section of the frame and a second shelf mechanism is rotatably coupled to a lower section of the frame. The first and second shelf mechanisms have a first deployment position for mounting objects when the shelf and dolly system is in a stable position on the base surface. The system includes a second operational position for the first and second shelf mechanism which lie adjacent the frame member on opposing sides to allow supporting of objects mounted on the base member while providing a compact easily maneuverable transportation system.

An object of the subject system is to provide a dolly system for transporting objects which is easily converted to a shelf system for mounting the objects thereon.

A further object of the subject system is to provide a collapsible dolly and shelf system which permits the user to quickly convert the dolly system into a shelf arrangement.

A still further object of the subject system is to provide a collapsible dolly and shelf system which includes at least two levels of shelving when the shelves are deployed.

Another object of the subject system is to provide at least a pair of shelving mechanisms which are coupled to each other rotationally for ease of deployment of shelves to a deployed position.

An object of the subject system is to provide at least a pair of shelving mechanisms which can be collapsed to a position adjacent the frame of the dolly.

A still further object of the subject system is to provide a dolly system which permits stability of objects being transported.

Another object of the subject system is to provide a collapsible dolly and shelving system where the shelving includes leg members which are rotatable with respect to shelving mechanisms which are rotatable with respect to shelving mechanisms and stabilize the collapsible dolly system when the shelving mechanisms are deployed.

A further object of the subject system is to provide a collapsible dolly system where at least first and second shelving mechanisms may be deployed in a simple and effective manner.

DESCRIPTION OF THE PREFERRED EMBODIMENTS

Figure 1:
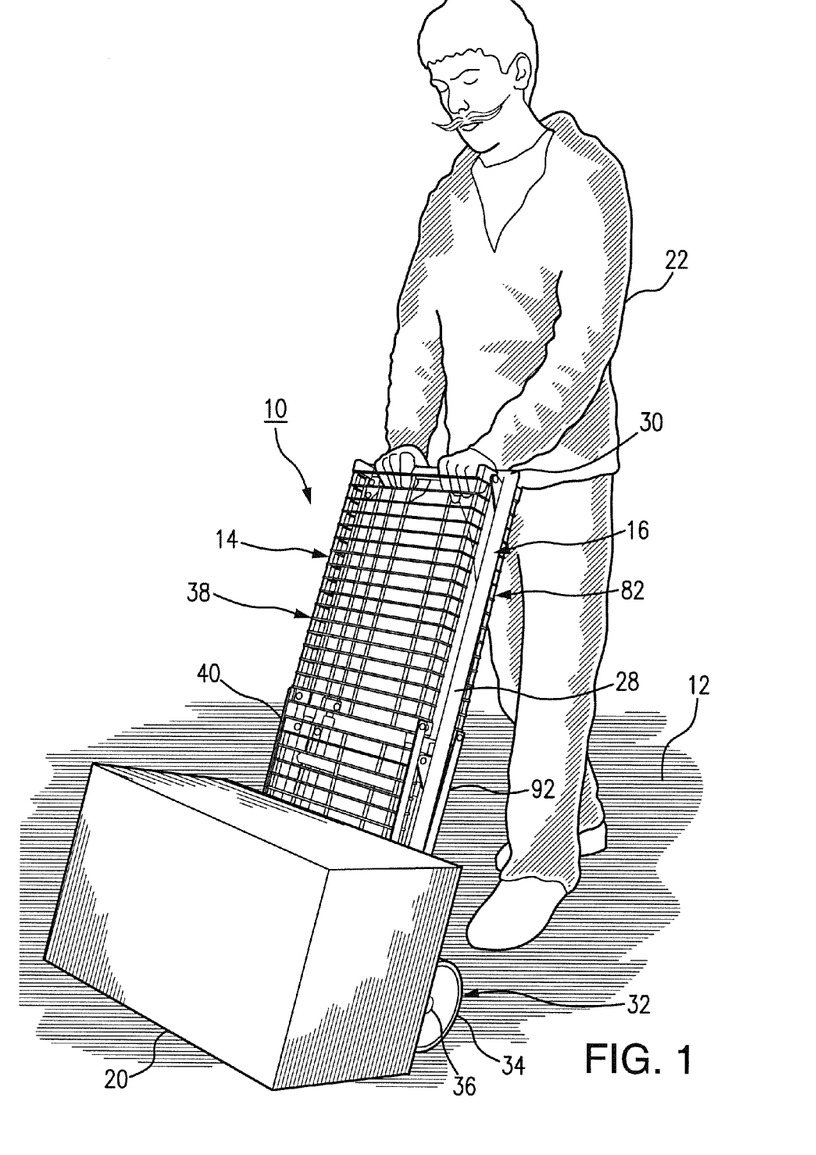
FIG. 1 is a perspective view of the subject collapsible shelf and dolly system showing a user transporting objects on a base surface.
Figure 2:
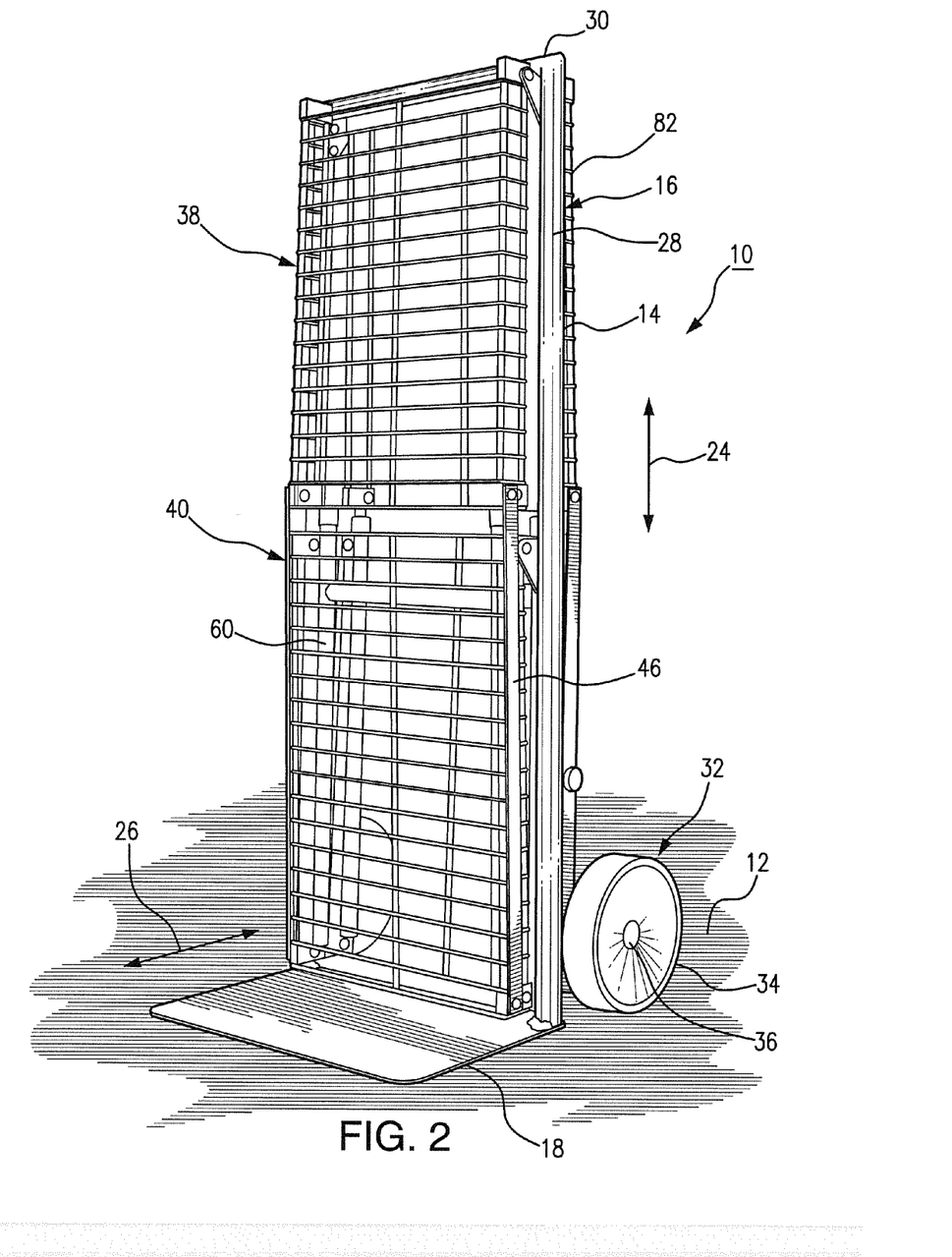
FIG. 2 is a perspective view of the collapsible shelf and dolly system where shelving mechanisms are collapsed against the frame of the dolly system.
Figure 3:
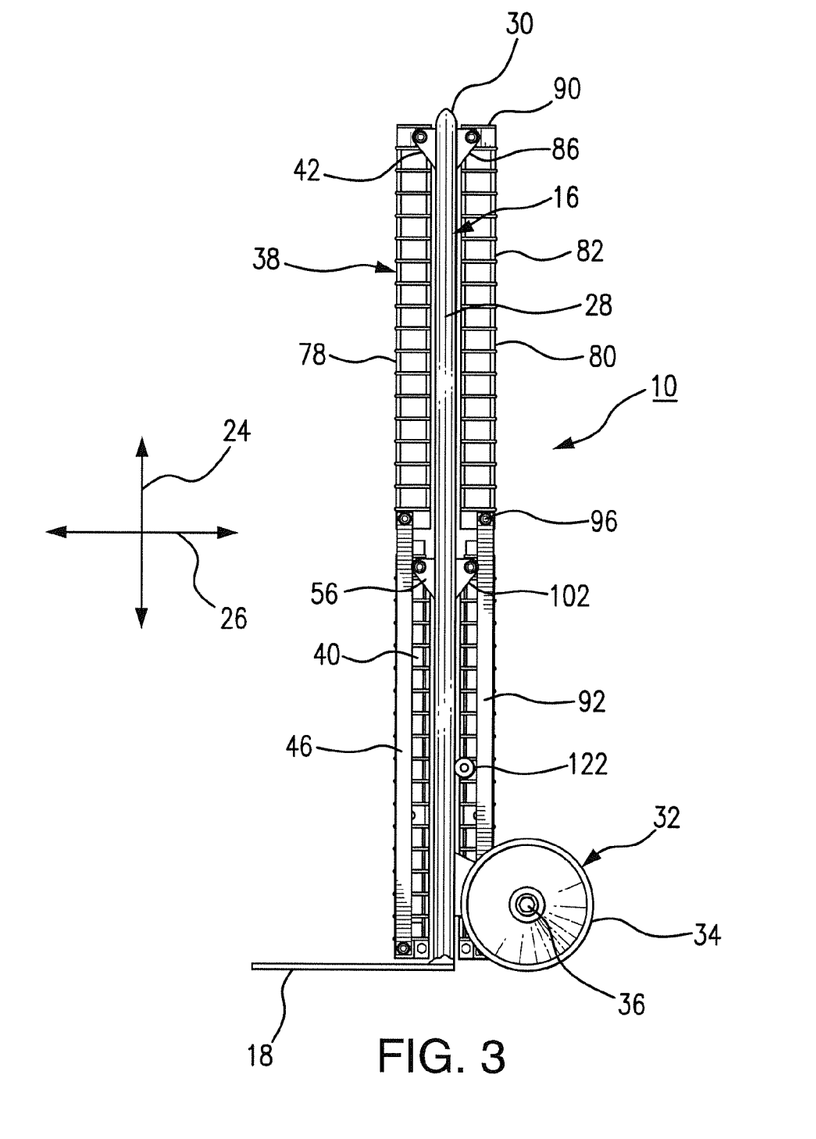
FIG. 3 is an elevational view of the collapsible shelf and dolly system when the dolly system is in a deployment position where shelving mechanisms are secured adjacent the dolly frame.
Figure 4:
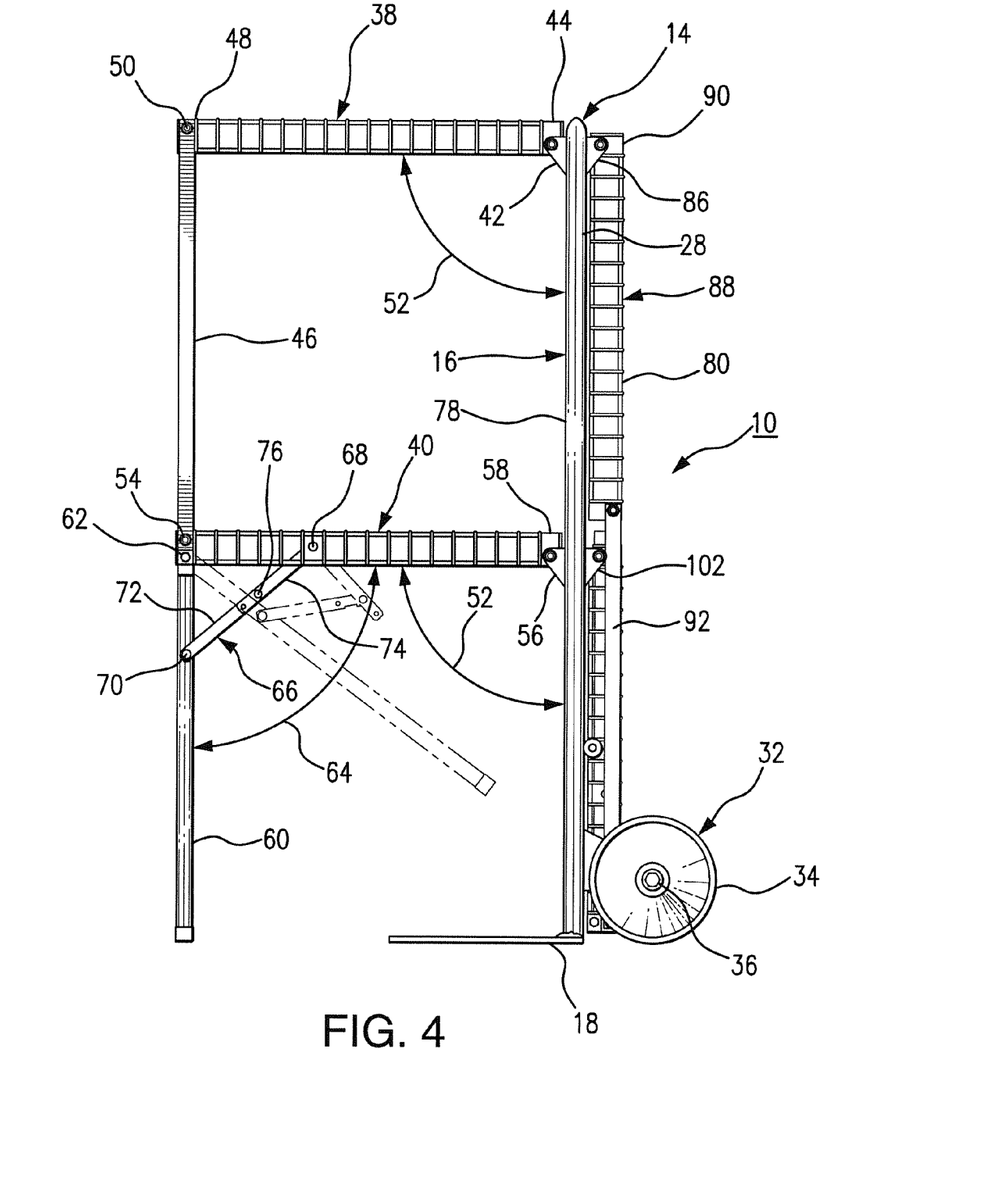
FIG. 4 is a side view of the collapsible shelf and dolly system showing first and second shelving mechanisms in a deployed position for accepting objects on a surface of the first and second shelving mechanisms.
Figure 5:
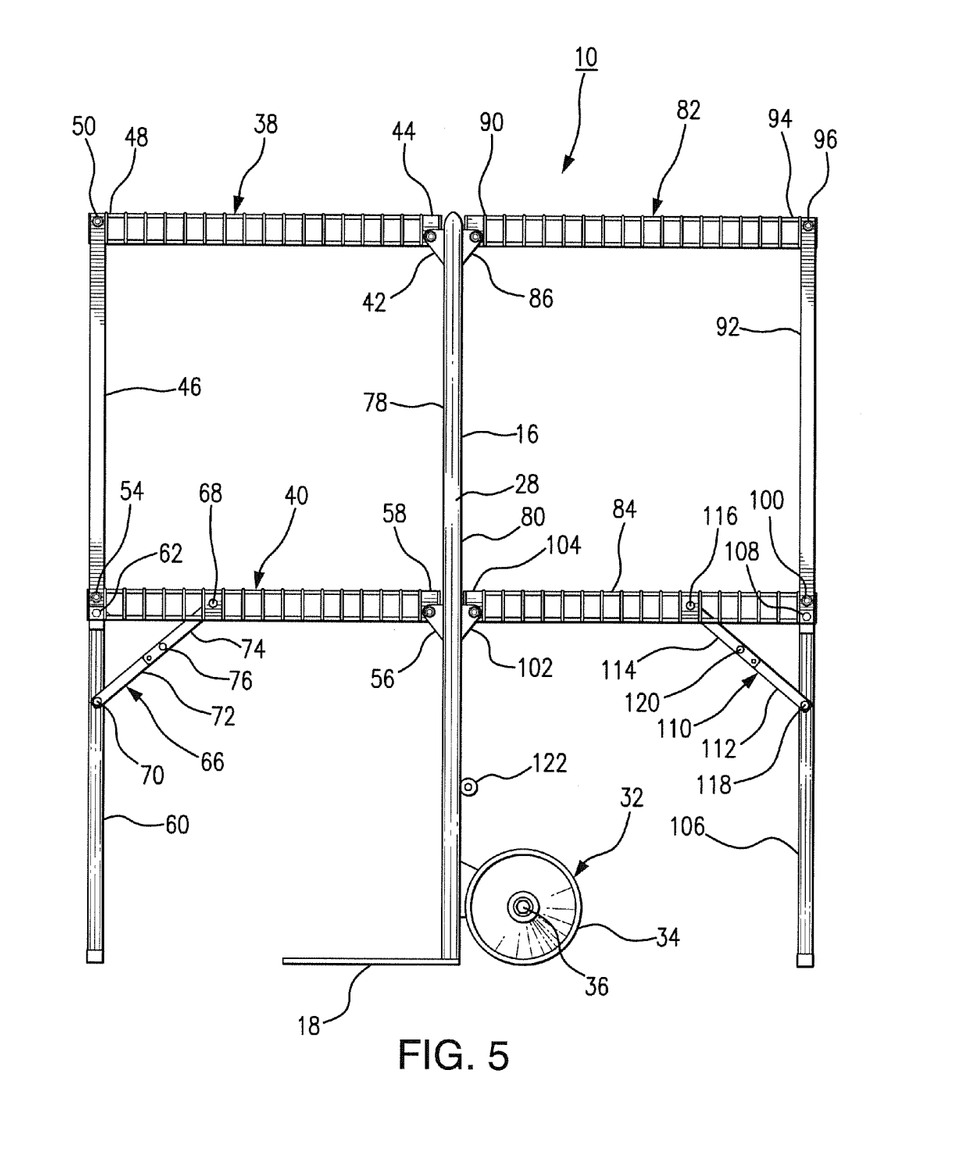
FIG. 5 is a side view of the collapsible shelf and dolly system showing first, second, third, and fourth shelving mechanisms deployed on opposing sides of the dolly frame.
Figure 6:
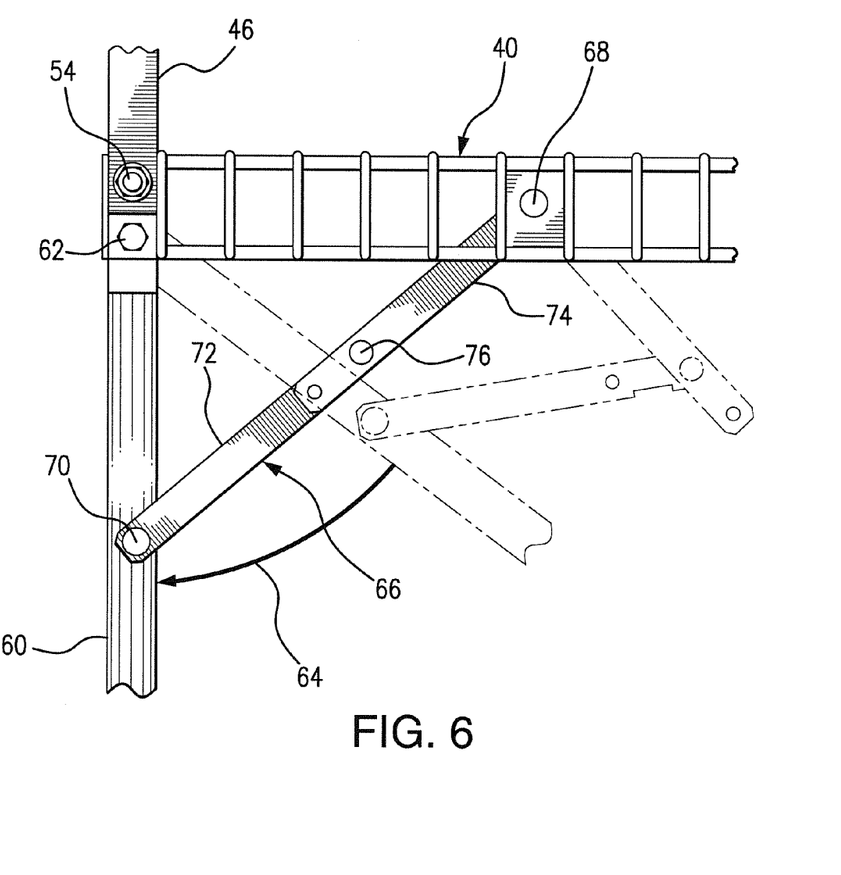
FIG. 6 is an elevational view partially cut-away of a locking linkage mechanism coupling the second shelving mechanism to a leg support member.

Referring now to FIGS. 1-9, there is shown a collapsible shelf and dolly system 10 for transporting an object 20 over a base surface 12, as is shown in FIGS. 1-2. Collapsible shelf and dolly system 10 is convertible to a shelf-like configuration, as is shown in FIG. 5 where objects 20 may be mounted on shelving mechanisms to be further described in following paragraphs.

In this manner, a user 22 may transport objects 20 and then re-configure collapsible shelf and dolly system 10 to a shelving system where objects 20 may be mounted thereon. In this manner, collapsible shelf and dolly system 10 provides for a re-configurable system which permits user 22 to easily transport objects 20 from one place to another and subsequently save space by conversion of collapsible shelf and dolly system 10 to a shelving system for mounting the objects. Such systems are extremely useful where space is a concern such as where students would transport objects to a dormitory room and then convert the collapsible shelf and dolly system 10 to a shelving system for saving space in the room. Additionally, such collapsible shelf and dolly system 10 has a wide variety of uses associated with displays being transported from one area to another and then permitting a simple set-up of the shelving system. Other areas of use would be in the area of workshops where heavy objects 20 are transported from one area to another and can be set up on the shelving system for further use in a quick and simple manner. Such collapsible shelf and dolly systems 10 are equally useful in both industrial and domestic settings.

Collapsible shelf and dolly system 10 includes dolly 14 comprising dolly frame 16 and dolly base member 18. Dolly frame 16 is formed in fixed relation to dolly base member 18 and would generally extend in vertical direction 24 with dolly base member 18 extending in horizontal direction 26. Dolly frame 16 is substantially perpendicular or normal to dolly base member 18 and dolly frame 16 is mounted to dolly base member 18 through welding, threaded securement, or by other methods which provide for fixed securement of dolly frame 16 to base member 18, not important to the overall description of collapsible shelf and dolly system 10, with the exception that dolly frame 16 and dolly base member 18 be of sufficient structural integrity to accept the loads of objects 20 mounted thereon for transportation. Base member 18 is generally planar in contour and formed of a metallic composition such as steel, aluminum, or some like metals which can accommodate the loads bearing thereon by objects 20.

Dolly frame 16 is generally formed of a pair of dolly frame side tubular members 28 and dolly frame top member 30 which may be used as a hand-hold for user 22 when objects 20 are being transported on dolly 14, as shown in FIG. 1. Dolly frame side tubular members 16 would in general be in an inverted U-shaped form to provide a mounting area for objects 20. Dolly frame side tubular members 28 extend in a substantially vertical direction 24 and are substantially normal to dolly base member 18, as is shown in FIG. 2. Dolly frame side tubular member 20, as well as dolly frame top tubular member 30 may be formed in a tubular contour, or some other contour not important to the invention system with the exception that the tubular contour be adapted to accept the structural loads imposed by the objects 20. Tubular dolly frame side tubular member 20 and dolly frame top tubular member 30 may be formed of a metal composition such as steel, aluminum, or some other metal or plastic composition.

Thus, dolly 14 includes dolly frame 16 and dolly base member 18 with dolly frame 16 extending in a substantially vertical plane with respect to dolly base member 18 which extends in a substantially horizontal plane. For purposes of this description, the horizontal plane is defined as the plane of base member 18 and the vertical plane is defined as a plane formed by dolly frame side tubular members 28, and top dolly frame member 30.

Displacement mechanism 32 includes a pair of wheels 34 mounted on opposing transverse sides of dolly frame 16. Axle 36 extends between wheels 34 and is attached to dolly frame 16 in any of a number of well-known techniques. In this manner, objects 20 may be mounted on dolly base member 18 and transported on base surface 12 in a rollable manner, much like the operational use of well-known dolly systems.

Referring specifically to FIGS. 4 and 5, collapsible shelf and dolly system 10 includes first shelf mechanism 38 seen in FIG. 4 where first shelf mechanism 38 is rotatably coupled to an upper section of dolly frame 16. Additionally, collapsible shelf and dolly system 10 includes second shelf mechanism 40 rotatably coupled to a lower section of dolly frame 16 with the first and second shelf mechanisms 38 and 40 having a first deployment position for mounting objects 20 thereon, as is depicted in the first deployment position shown in FIGS. 4 and 5. Additionally, there is a second operational position for first and second shelf mechanism 38 and 40 where such lie adjacent dolly frame 16 for transporting of objects mounted on dolly base member 18, as is seen in FIGS. 1-3. As will be detailed in following paragraphs, first and second shelf mechanisms 38 and 40 are rotatably actuated to permit first and second shelf mechanisms 38, 40 to be reversibly displaceable to provide a shelf system or to be displaced to a collapsed position.

First shelf mechanism 38 includes a pair of first shelf mechanism hinges 42 mounted on opposing transverse sides of dolly frame 16, as depicted in FIGS. 4 and 5. First shelf mechanism hinges 42 permit rotational coupling between first shelf mechanism 38 and dolly frame 16. Thus, a first end of first shelf mechanism 44 is rotationally coupled to dolly frame 16, as is seen in FIG. 4 with the rotational direction 52 being accomplished between first shelf mechanism 38 and dolly frame 16. A pair of first shelf mechanism support members 46 mounted on opposing transverse sides of first shelf mechanism 38 are provided where first shelf mechanism support members 46 are pivotally coupled to second end 48 of first shelf mechanism 38 at a first end of shelf mechanism support member 46, shown as first shelf pivot 50. Pivot 50 may be a pin type of coupling which allows rotation of first shelf mechanism support member 46 with respect to first shelf mechanism 38. First shelf mechanism support member 46 may be a bar member or tubular member formed of either a metallic composition, or plastic composition with the only restriction being that it be of sufficient structural integrity to support any object 20 loads which are applied to the system 10 when objects 20 are mounted thereon on either or both of first and second shelf mechanisms 38 and 40.

First shelf mechanism support member 46 is pivotally coupled to second shelf mechanism 40 at a second end of first shelf mechanism support member as defined by pivot 54 shown in FIGS. 4 and 5. Thus, first shelf mechanism support member 46 is pivotally coupled to first and second shelf mechanisms 38 and 40 at respective opposing sides of first shelf mechanism support member 46 as defined by the pivots 50 and 54. As previously stated for pivot 50, pivot 54 may be a pin arrangement which permits rotation of first shelf mechanism support member 46 with respect to first and second shelf mechanisms 38 and 40.

Referring in particular to FIGS. 4 and 5, collapsible shelf and dolly system 10 includes second shelf mechanism hinge 56 for rotatably coupling first end 58 of second shelf mechanism 38 to frame 16. Hinge 56 is similar in nature to hinge 420 and is provided for rotational displacement of second shelf mechanism 40 in rotational direction 52, as was the case discussed for rotation of first shelf mechanism 38 with respect to frame 16. A pair of second shelf mechanism leg members 60 are rotationally coupled to a second end of second shelf mechanism 38 shown as pivot 62. In this manner, second shelf mechanism leg member 60 may be rotationally displaced with respect to second shelf mechanism 40 in rotational direction 64 shown in FIG. 4.

At least one first locking linkage 66 is pivotally coupled on opposing ends to second shelf mechanism 40 and second shelf mechanism leg member 60. First locking linkage 66 is pivotally coupled at opposing pivot points 68 and 70, respectively, to second shelf mechanism 40 and second shelf mechanism leg member 60, as shown. First locking linkage 66 may include first and second link members 72 and 74 which are pivotally coupled to each other at pivot points 76, as shown. In this manner, as is shown in FIG. 4, second shelf leg member 60 may be rotationally activated in rotational direction 64 to be positioned adjacent second shelf mechanism 40 when collapsible shelf and dolly system 10 is being actuated to the second operational position where the first and second shelf mechanisms 38 and 40 are positioned adjacent dolly frame 16 for transporting objects 20 mounted on base member 18. The rotational actuation of second shelf mechanism leg member 60 is seen in broken line in FIG. 4.

When collapsible shelf and dolly system 10 is in a position defined by the depiction of the first and second shelf mechanisms 38 and 40 in FIGS. 4 and 5, second shelf mechanism leg members 60 extend in generally vertical direction 24 and bear against base surface 20 to provide structural support and stability to the deployed shelving mechanisms 38 and 40.

Thus, collapsible shelf and dolly system 10 permits first and second shelf mechanisms 38 and 40 to be reversibly and rotatably coupled to dolly frame 16 on a first side 78 of frame 16 to permit deployment of first and second shelf mechanisms to either a position adjacent dolly frame 16 or in a deployed state where objects 20 may be loaded onto shelving mechanisms 38 and 40.

Collapsible shelf and dolly system 10 provides for opposing first and second sides 78 and 80 of dolly frame 16. As seen in FIGS. 4 and 5, third and fourth shelf mechanism 82 and 84 are coupled to second side 80 in a manner similar to the coupling of first and second shelf mechanisms 38 and 40 to first side 78.

Third shelf mechanism 82 shown in the deployed position in FIG. 5, is rotatably coupled to the upper section of dolly frame 16 on second side 80 of dolly frame 16.

Fourth shelf mechanism 84 is rotationally coupled to a lower section of dolly frame 16 on second side 80 of dolly frame 16. Both the third and fourth shelf mechanisms 82 and 84 provide for a first deployment position for mounting objects such as object 20 on base surface 18 of dolly 14 and a second operational position where third and fourth shelf mechanisms 82 and 84 are positioned adjacent the second side 80 of the dolly frame 16.

Third shelf mechanism 82 includes third shelf mechanism hinge 86 similar in construction to first shelf mechanism hinge 42 mounted to the first side 78 of frame 16. Third shelf mechanism hinge 86 thus pivotally couples dolly frame 16 to third shelf mechanism 82 at third shelf mechanism first end 90, as is shown in FIG. 5. Third shelf mechanism support member 92 is pivotally coupled to third shelf mechanism 82 at third shelf mechanism second end 94 in a manner substantially the same as first shelf mechanism support member 46 being pivotally coupled to first shelf mechanism 38, as previously described.

Thus, third shelf mechanism 82 and third shelf support member 92 are pivotally joined to each other at pivot 96. Third shelf mechanism support member 92 is pivotally coupled to fourth shelf mechanism 98 at a second end of third shelf support member 92 defined by pivot 100. The mounting elements of the coupling of third shelf support member 92 with respective third shelf mechanism 82 and 84 are substantially the same as the couplings discussed for first shelf mechanism support member 46 in relation to first and second shelf mechanisms 38 and 40. Thus, in the manner disclosed, third shelf mechanism support member 92 is rotationally and pivotally coupled to third and fourth shelf mechanisms 82 and 84 at respective opposing ends of third shelf mechanism support member 92.

A fourth shelf mechanism hinge 102 rotationally couples fourth shelf mechanism 84 first end 104 to the second side 80 of the dolly frame 16. An opposing first end of fourth shelf mechanism 84 is rotationally coupled to third shelf support member 92 at pivot 100.

Fourth shelf mechanism leg member 106 is pivotally coupled to fourth shelf mechanism 84 at pivot 108, in the manner as provided for second shelf mechanism leg member 60 being rotationally actuated with respect to second shelf mechanism 40, as previously discussed. Second linkage 110 is provided for constraining third and fourth shelf mechanisms 82 and 84 to said frame 16 when third and fourth shelf mechanisms 82 and 84 are in the first operational position shown in FIG. 5 to provide objects 20 to be mounted on collapsible shelf and dolly system 10. Much in the manner of first locking linkage 66, second linkage 110 includes second linkage first link 112 and second link 114 which are pivoted to each other at pivot 120. Opposing ends of respective link members 112 and 114 are pivoted respectively to fourth shelf mechanism 84 and fourth shelf mechanism leg member 106 at pivot points 116 and 118, as is shown in FIG. 5.

In the depiction shown in FIG. 5, as well as FIG. 4, it is seen that once linkages 66 and 110 are positioned as shown, collapsible shelf and dolly system 10 is situated in the first deployment position in a locked manner to provide a secure structural mounting for any objects 20 mounted on one or more of shelf mechanisms 38, 82, 40, and/or 84.

Collapsing of third and fourth shelf mechanisms 82 and 84 from the first deployed position as shown in FIG. 5 to the second deployed position shown in FIG. 4 in a manner which is similar to that discussed for the collapsing of first and second shelf mechanisms 38 and 40.

Figure 7:
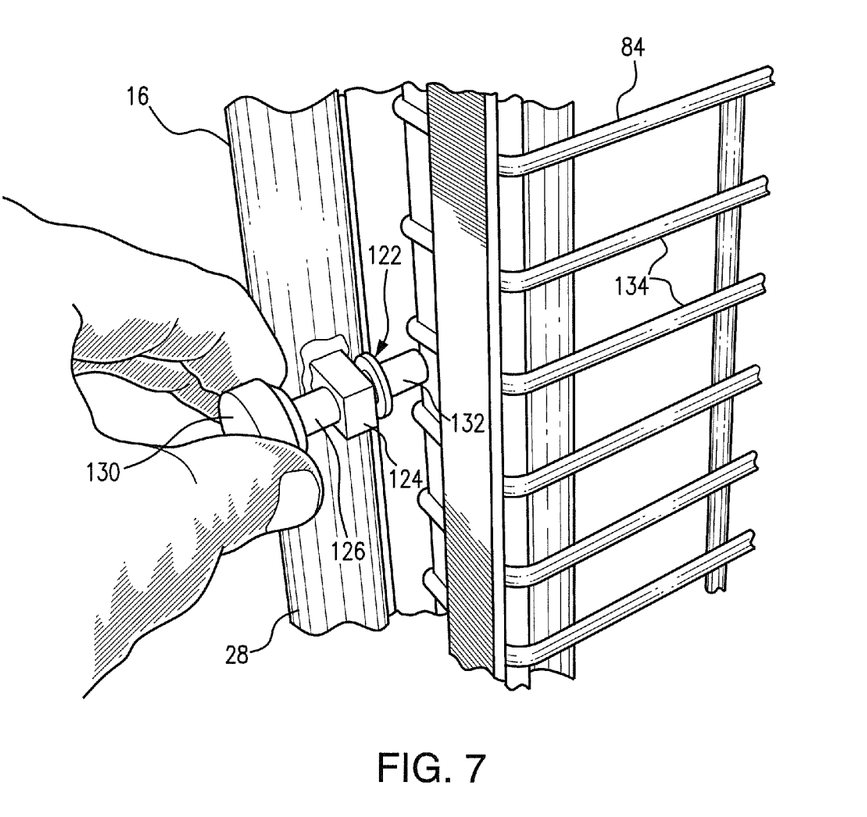
FIG. 7 is a perspective view, partially cut-away, showing a locking mechanism to lock the fourth shelving mechanism to the dolly frame.
Figure 8:
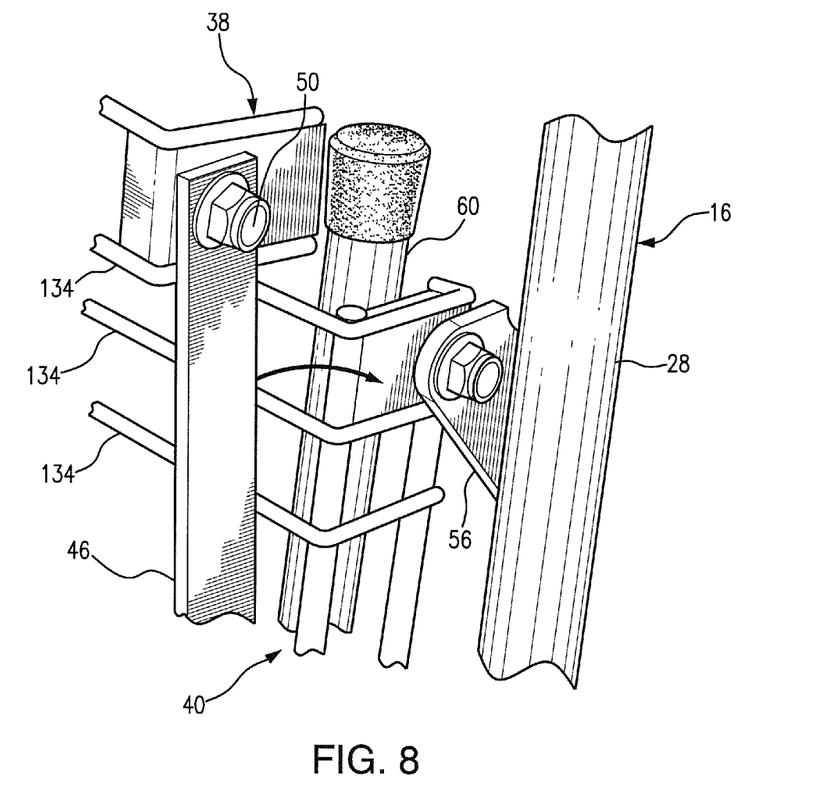
FIG. 8 is a perspective view, partially cut-away, showing partial deployment of first and second shelf mechanisms as they are being collapsed; and, FIG. 9 is an elevational view, partially cut-away, showing mounting of the shelving mechanism to the dolly frame.
Figure 9:
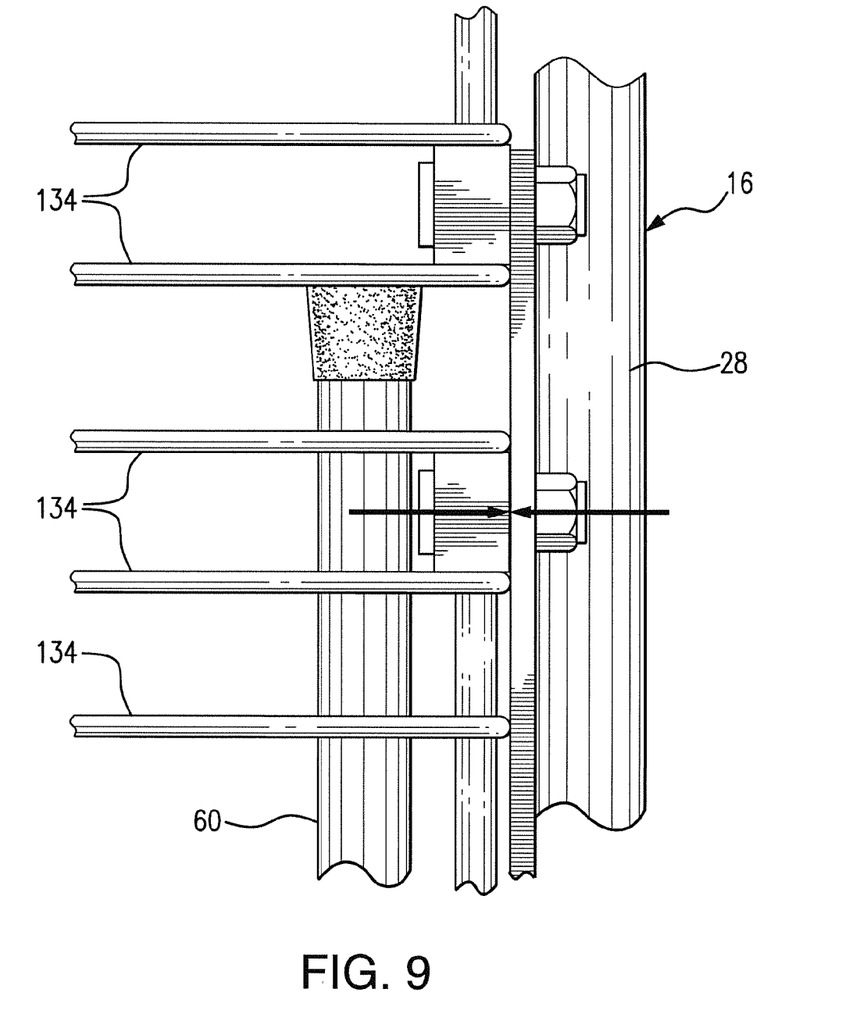

Due to the fact that when the dolly system is being used to transport objects 20 on base 18, third and fourth shelf mechanisms 82 and 84 may be movably displaced with respect to dolly frame 16, there is provided a shelf locking mechanism 122 more clearly seen in FIG. 7. Shelf locking mechanism 122 is provided to constrain third and fourth shelf mechanisms 82 and 84 to dolly frame 16. Shelf locking mechanism 122 includes locking lug member 124 which is fixedly attached to dolly frame 16 through some type of securement, such as welding, threaded securement, or other like technique. Extension member 126 having a knob 130 extends through an opening formed in lug locking member 24 for passage into a locking element 132 which is fixedly attached to fourth shelf mechanism 84 or may be inserted directly into fourth shelf mechanism 84 in order to constrain both fourth shelf mechanism 84 and third shelf mechanism 82 to the second side 80 of dolly frame 16.

First, second, third, and fourth shelf mechanisms 38, 40, 82, and 84 may be formed of a wire mesh construction using wires 34 displaced each from the other to provide a vertically open through passage through respective shelf mechanisms. Alternatively, as is known to those skilled in the art, shelf mechanisms 38, 40, 82, and 84 may be formed of a continuous plane board member type construction.

Although this invention has been described in connection with specific forms and embodiments thereof, it will be appreciated that various modifications other than those discussed above may be resorted to without departing from the spirit or scope of the invention as defined in the appended claims. For example, functionally equivalent elements may be substituted for those specifically shown and described, certain features may be used independently of other features, and in certain cases, particular locations of elements, steps, or processes may be reversed or interposed, all without departing from the spirit or scope of the invention as defined in the appended claims.

What is claimed is:

1. A collapsible shelf and dolly system comprising:
    (a) a dolly having a frame and a base member, said frame extending in a substantially vertical plane with respect to said base member extending in a substantially horizontal plane;
    (b) a displacement mechanism mounted to said frame for displacing said shelf and dolly system along a base surface;
    (c) a first shelf mechanism rotatably coupled to an upper section of said frame, said first shelf mechanism includes:
        (i) at least one first shelf mechanism hinge for rotatably coupling a first end of said first shelf mechanism to said frame; and,
        (ii) at least one first shelf mechanism support member pivotally coupled to a second end of said first shelf mechanism at a first end of said first shelf mechanism support member; and,
    (d) a second shelf mechanism rotatably coupled to a lower section of said frame, said first and second shelf mechanisms having a first deployment position for mounting objects thereon, and a second operational position adjacent said frame for transporting objects mounted on said base member.

2. The collapsible shelf and dolly system as recited in claim 1 where said first shelf mechanism support member is pivotally coupled to said second shelf mechanism at a second end of said first shelf mechanism support member.

3. The collapsible shelf and dolly system as recited in claim 1 where said first shelf mechanism support member is pivotally coupled to said first and second shelf mechanisms at respective opposing ends of said first shelf mechanism support member.

4. The collapsible shelf and dolly system as recited in claim 1 including:
    (a) at least one second shelf mechanism hinge for rotatably coupling a first end of said second shelf mechanism to said frame; and,
    (b) at least on second shelf mechanism leg member pivotally coupled to a second end of said second shelf mechanism at a first end of said second shelf mechanism leg member.

5. The collapsible shelf and dolly system as recited in claim 4 including at least one first locking linkage pivotally coupled on opposing ends thereof to said second shelf mechanism and said second shelf mechanism leg member respectively.

6. The collapsible shelf and dolly system as recited in claim 5 where said first locking linkage includes a first link member pivotally coupled to a second link member and said first and second link members being respectively pivotally coupled to said second shelf mechanism leg member and said second shelf mechanism.

7. The collapsible shelf and dolly system as recited in claim 1 where said first and second shelf mechanisms are rotatably coupled to said frame on a first side of said frame, said frame having a second side opposite said first side of said frame.

8. The collapsible shelf and dolly system as recited in claim 7 including:
    (a) a third shelf mechanism rotatably coupled to said upper section of said frame on said second side of said frame; and,
    (b) a fourth shelf mechanism rotatably coupled to said lower section of said frame on said second side of said frame, said third and fourth shelf mechanisms having said first deployment position for mounting objects thereon and a second operational position adjacent said second side of said frame.

9. The collapsible shelf and dolly system as recited in claim 8 where said third shelf mechanism includes:
    (a) at least one third shelf mechanism hinge mounted to said second side of said frame for rotatably coupling a first end of said third shelf mechanism to said frame; and,
    (b) at least one third shelf mechanism support member pivotally coupled to a second end of said third shelf mechanism at a first end of said third shelf mechanism support member.

10. The collapsible shelf and dolly system as recited in claim 9 where said third shelf mechanism support member is pivotally coupled to said fourth shelf mechanism at a second end of said third shelf mechanism support member.

11. The collapsible shelf and dolly system as recited in claim 8 where said third shelf mechanism support member is pivotally coupled to said third and fourth shelf mechanisms at respective opposing ends of said third shelf mechanism support member.

12. The collapsible shelf and dolly system as recited in claim 8 including:
    (a) at least one fourth shelf mechanism hinge for rotatably coupling a first end of said fourth shelf mechanism to said second end of said frame; and,
    (b) at least one fourth shelf mechanism leg member pivotally coupled to a second end of said fourth shelf mechanism at a first end of said fourth shelf mechanism leg member.

13. The collapsible shelf and dolly system as recited in claim 12 including at least one second locking linkage pivotally coupled on opposing ends thereof to said fourth shelf mechanism and said fourth shelf mechanism leg member respectively.

14. The collapsible shelf and dolly system as recited in claim 8 including a shelf locking mechanism mounted to said frame for constraining said third and fourth shelf mechanisms to said frame when said third and fourth shelf mechanisms are in said first operational position on said second side of said frame.

15. The collapsible shelf and dolly system as recited in claim 14 where said shelf locking mechanism includes:
    (a) a locking lug member having a through opening fixedly secured to said frame; and,
    (b) an extension member slidably insertable through said locking lug member through opening for capturing said fourth shelf mechanism.

16. The collapsible shelf and dolly system as recited in claim 1 where said first and second shelf mechanisms are formed of an open wire frame mesh construction.

17. The collapsible shelf and dolly system as recited in claim 1 where said first and second shelf mechanisms are formed in a continuous substantially planar section.

18. The collapsible shelf and dolly system as recited in claim 1 where said displacement mechanism includes at least a pair of wheels having an axle extending therebetween said axle fixed to said frame at a lower end thereof.

* * * * *